Jan. 6, 1970  I. HOROWITZ ET AL  3,487,889
FABRICATED PLASTIC STEP
Filed Dec. 22, 1967
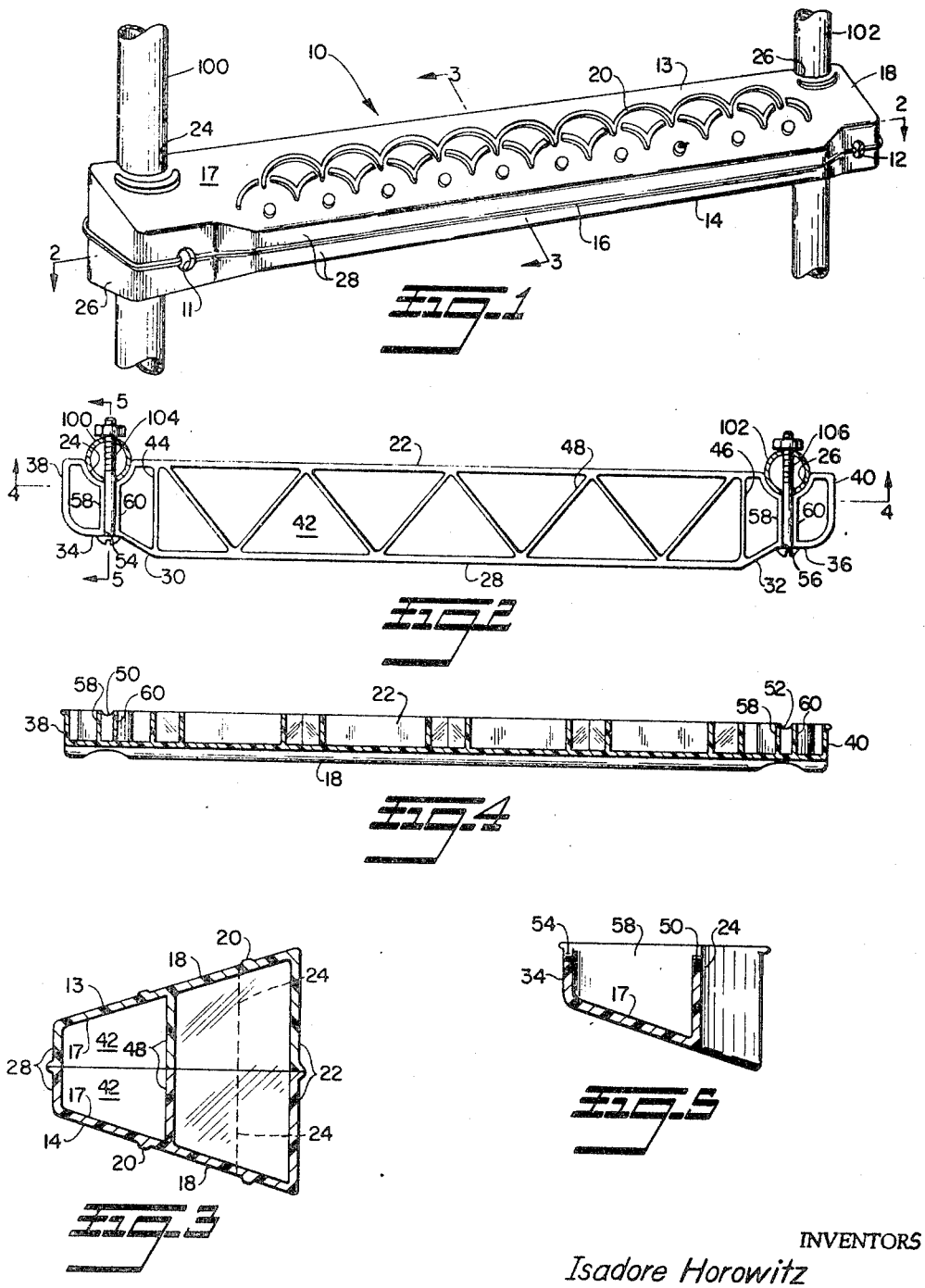
INVENTORS
*Isadore Horowitz*
*Edward T. Carlin*
BY *Strauch, Nolan, Neale, Nies & Kurz*
ATTORNEYS

United States Patent Office 3,487,889
Patented Jan. 6, 1970

3,487,889
FABRICATED PLASTIC STEP
Isadore Horowitz and Edward T. Carlin, Shreveport, La., assignors to Gym Dandy, Inc., Bossier City, La., a corporation of Louisiana
Filed Dec. 22, 1967, Ser. No. 693,014
Int. Cl. E06c 7/08, 1/00
U.S. Cl. 182—46        5 Claims

ABSTRACT OF THE DISCLOSURE

A fabricated step including identical separately molded plastic half-sections integrally bonded together, each half-section comprising an external tread surface and mating stiffening ribs. The half-sections are fused together with their ribs oppositely contacting each other and their tread surfaces exposed for use to provide a rigid, stable step having two tread surfaces which double its useful life.

FIELD OF INVENTION

This invention relates generally to ladder step structures and more particularly to a novel fabricated plastic step especially useful in home play equipment such as sliding boards, climbing bars, etc., but not limited thereto.

DESCRIPTION OF PRIOR ART

Climbing ladders and steps for play equipment have commonly been constructed of cast iron, steel, or aluminum, which of course resulted in a costly, rather heavy and cumbersome structure. This construction limited the overall maneuverability of the equipment and resulted in high shipping weight and increased chances of injury to children who frequently brush and bump against the step while climbing the ladder. Additionally, the metallic structure when exposed to the weather was subject to rusting and required frequent painting. A typical construction is illustrated by Patent No. 1,680,754.

Lightweight metals such as aluminum also used in the construction of ladders and steps provided a lighter overall structure, but increased factory costs and did not eliminate the possibility of physical injury or weather problems.

Also, use of plastic tread members along with metal ladder rungs to form the steps of a ladder has been proposed as shown by Patent No. 2,992,697. This step construction, however, is unstable and is connected to the ladder support rails by rather complicated connection structure which makes assembly and disassembly of the ladder and the individual steps a tedious task. Additionally, the step still requires the use of a metal rung for stability.

Thus the prior art, particularly play equipment, demonstrates the need of a lightweight, low cost step having sufficient stability and wear resistance to function over an extended period of time even when exposed to the weather and capable of reducing the chances of physical injury to children playing on the step.

SUMMARY OF THE INVENTION

The primary object of this invention is to provide a novel low cost, lightweight fabricated plastic step which is rigid, stable, resistant to wear and safe.

Another object is to provide a novel fabricated plastic step having separately molded half-sections bonded together under heat and pressure to form an integral rigid step structure.

A further object is to provide a novel fabricated plastic step comprising separately molded half-sections identical in structure, each half having stiffening ribs and a tread plate, so arranged that when the halves are integrally bonded together the step has two tread surfaces available for selective use to effectively double its useful life.

Other objects and advantages will become apparent from the following description and appended claims when read in conjunction with the accompanying drawing.

BRIEF DESCRIPTION OF THE DRAWING

FIGURE 1 is a perspective view of the prefabricated step of the invention attached to opposite ladder rails;

FIGURE 3 is a transverse sectional view along line 2—2 of FIGURE 1 illustrating the stiffening ribs in each half-section;

FIGURE 3 is a transverse sectional view along line 3—3 of FIGURE 1;

FIGURE 4 is a sectional view along line 4—4 of FIGURE 2; and

FIGURE 5 is a sectional view along line 5—5 of FIGURE 2.

DESCRIPTION OF THE PREFERRED EMBODIMENT

Referring now to FIGURE 1, step 10 having lateral through apertures 11 and 12 adjacent its opposite end and vertical recesses 24 and 26 dimensioned to receive ladder rails 100 and 102 of a sliding board (not shown) is secured to the rails by bolt and nut assemblies 104, 106 passing through apertures 11 and 12 and mating bolt holes in rails 100 and 102. The step 10 comprises two separately molded plastic upper and lower half-sections 13 and 14 respectively, integrally bonded together along plane 16 defined by their abutting open faces by heat and pressure. The sections 13 and 14 are identical and, when assembled as shown in FIGURE 1, one section is the mirror image of the other. Each half-section is laterally tapered to provide a downwardly sloped tread plate 17 when positioned as upper section 13. The outer surface 18 of plates 17 are provided with non-slip raised arcuate ribbin 20 arranged to engage the shoe sole or foot of a person climbing the ladder.

As best seen in FIGURES 2–4, each section has a rear wall 22 extending angularly to plate 17 and at right angles to plane 16 and formed adjacent its ends with arcuate recesses 24 and 26, front wall 28 sloped inwardly at 30 and 32 to define reduced end portions 34 and 36 generally opposite recesses 24 and 26, and end walls 38 and 40, all of which enclose a substantially hollow space 42. Spaced transverse stiffening ribs 44, 46 and zigzag rib 48 are integrally molded to walls 22 and 28 in space 42 and to the inner face of tread plate 17 to impart strength and stability to the step.

As illustrated in FIGURES 4 and 5 the bolt receiving apertures 11 and 12 are formed by transverse notches 50 and 52 in vertical wall recesses 24 and 26 and similar aligned notches 54 and 56 in wall 28. Transverse stiffening ribs 58 and 60 extend between walls 22 and 28 adjacent the aligned transverse bolt receiving notches to prevent the walls from collapsing when the step is bolted to the ladder rails.

In each half-section, the ends of walls 22, 28, 38 and 40 and ribs 44, 46, 48, 58 and 60 opposite tread plate 17 terminate in substantially the same transverse plane forming abutment surfaces for fusing when the integral step of FIGURE 1 is fabricated by placing two singularly molded half-sections into opposing engagement with their hollow spaces 42 facing each other and surfaces 18 of treads 17 exposed for use and applying heat and pressure to the sections so that all contacting surfaces including the abutting ends of walls 22, 28, 38 and 40 and stiffening ribs 44, 46, 48, 58 and 60 will be bonded and sealed together.

The advantages of this step structure are apparent. First, the finished step is sufficiently rigid and stable for extended use due to the presence of the stiffening ribs, but yet is lightweight and somewhat flexible because it is completely constructed of molded plastic. Second, when one of the wear surfaces 18 becomes worn, the step need only be turned over end to end to present a completely new tread surface for use, thus effectively doubling the useful life of the step. Third, the chances of a child suffering body injuries such as scuffs and bruises are reduced as a result of the plastic construction. Fourth, the overall cost is reduced because of the use of plastic material which can be colored as desired, the ease of fabrication, and the increase in useful step life. Fifth, the plastic construction is not affected by adverse weather conditions, thus reducing the maintenance requirements of the equipment.

Although the step of the invention has been described with particular utility in home play equipment, it may of course be used in any general ladder construction.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A fabricated step comprising separately molded plastic sections, each comprising tread plate means having wear surface means on one face and wall means extending from the other face and defining peripheral stiffening walls, said sections being fused and joined together to form an integral structure with the stiffening walls opposite each other and the wear surface means exposed for alternate use.

2. The fabricated step of claim 1 wherein said stiffening walls are interconnected by stiffening ribs integrally molded together with said tread plate means and wall means, the opposing wall means and stiffening ribs of said sections being opposingly arranged and integrally bonded together.

3. The fabricated step of claim 2 wherein said wall means comprises rear and front walls, said rear wall having vertically extending arcuate recess means adjacent each end and transverse notches in the free end of each said vertical recess means, said front wall having transverse notches adjacent each end aligned with said rear wall notches, the opposed notches of said joined sections defining aligned apertures in said rear and front walls adapted to receive bolts for connecting said step to ladder rails received in said vertical recess means.

4. The fabricated step of claim 3 comprising transverse stiffening means extending between said rear and front walls adjacent each said notches.

5. The fabricated plastic step of claim 1 wherein said wear surface means includes upstanding arcuate ribbing forming non-slip engagement means to assist in climbing the ladder.

References Cited

UNITED STATES PATENTS

| | | | |
|---|---|---|---|
| 2,792,164 | 5/1957 | Cauffield | 182—46 |
| 2,870,793 | 1/1959 | Bailey | 182—46 |
| 2,992,697 | 7/1961 | Klages | 182—46 |
| 3,077,241 | 2/1963 | Klages | 182—46 |
| 3,260,522 | 7/1966 | White et al. | 182—46 |
| 2,265,155 | 8/1966 | Thatcher | 182—228 |
| 3,381,775 | 5/1968 | Livers | 182—228 |

REINALDO P. MACHADO, Primary Examiner

U.S. Cl. X.R.

182—228